(12) United States Patent
Yang et al.

(10) Patent No.: US 11,845,829 B2
(45) Date of Patent: Dec. 19, 2023

(54) TWO-COMPONENT POLYURETHANE COMPOSITION

(71) Applicants: Dow Global Technologies LLC, Midland, MI (US); Rohm and Haas Company, Collegeville, PA (US)

(72) Inventors: Xiaohong Yang, Shanghai (CN); Fengzhe Shi, Shanghai (CN); Jinfei Wang, Shanghai (CN); Juan Zhao, Shanghai (CN); Li Zhou, Shanghai (CN)

(73) Assignees: DOW GLOBAL TECHNOLOGIES LLC, Midland, MI (US); ROHM AND HAAS COMPANY, Collegeville, PA (US)

(*) Notice: Subject to any disclaimer, the term of this patent is extended or adjusted under 35 U.S.C. 154(b) by 25 days.

(21) Appl. No.: 17/625,119

(22) PCT Filed: Aug. 15, 2019

(86) PCT No.: PCT/CN2019/100775
§ 371 (c)(1),
(2) Date: Jan. 6, 2022

(87) PCT Pub. No.: WO2021/026880
PCT Pub. Date: Feb. 18, 2021

(65) Prior Publication Data
US 2022/0267508 A1   Aug. 25, 2022

(51) Int. Cl.
| C08G 18/62 | (2006.01) |
| C09D 175/00 | (2006.01) |
| C09D 175/04 | (2006.01) |
| C08G 18/12 | (2006.01) |
| C08G 18/38 | (2006.01) |

(52) U.S. Cl.
CPC ......... C08G 18/6229 (2013.01); C08G 18/12 (2013.01); C08G 18/3878 (2013.01); C09D 175/04 (2013.01)

(58) Field of Classification Search
CPC .................. C08G 18/6229; C09D 175/04
See application file for complete search history.

(56) References Cited

U.S. PATENT DOCUMENTS

| 4,401,794 A | 8/1983 | Oriel et al. |
| 5,663,272 A | 9/1997 | Slack et al. |
| 6,028,158 A | 2/2000 | Slack et al. |
| 7,291,666 B2 | 11/2007 | Kodama et al. |
| 9,365,739 B2 | 6/2016 | Dombrowski et al. |
| 10,259,967 B2 | 4/2019 | Tromsdorf et al. |
| 2002/0058749 A1* | 5/2002 | Larson ............... C09D 133/064 526/287 |
| 2005/0245661 A1* | 11/2005 | Kodama ............ C08G 18/6254 524/457 |
| 2006/0155095 A1 | 7/2006 | Daussin et al. |
| 2011/0036947 A1 | 2/2011 | Knight |
| 2014/0121317 A1* | 5/2014 | Takahashi ............ C09D 143/02 524/547 |

FOREIGN PATENT DOCUMENTS

| CN | 1646634 A | 7/2005 | |
| CN | 102167946 A | 8/2011 | |
| CN | 107057545 A | 8/2017 | |
| CN | 107207636 A | 9/2017 | |
| EP | 0566096 A1 * | 10/1993 | ............... C09D 5/44 |
| JP | 2005295366 A | 10/2005 | |

OTHER PUBLICATIONS

Chinese Search Report for the corresponding Chinese Application No. 201980099110.9; dated Nov. 1, 2022; 2 pages.

* cited by examiner

*Primary Examiner* — Michael L Leonard
(74) *Attorney, Agent, or Firm* — Karl Stauss; Susan Zerull

(57) ABSTRACT

A two-component polyurethane composition comprising: a specific emulsion polymer, and a water-dispersible polyisocyanate; the emulsion polymer comprising, by weight based on the weight of the emulsion polymer, (a) greater than 15% to less than 30% of structural units of tert-butyl methacrylate, (b) greater than 10% of structural units of a hydroxy-functional alkyl (meth)acrylate, (c) structural units of a phosphorous-containing acid monomer and/or a salt thereof, (d) structural units of an additional acid monomer and/or a salt thereof, and (e) structural units of an additional monoethylenically unsaturated nonionic monomer; wherein the weight ratio of (d)/(c) is in the range of from 7.1:1 to 9.9:1; and a process of preparing the two-component polyurethane composition.

14 Claims, No Drawings

TWO-COMPONENT POLYURETHANE COMPOSITION

FIELD OF THE INVENTION

The present invention relates to a two-component polyurethane composition and a process of preparing the same.

INTRODUCTION

Conventional solvent-borne two-component polyurethane coating compositions provide excellent appearance but usually contain high volatile organic compound (VOC) content. Water-borne two-component polyurethane coating compositions comprising water-dispersible isocyanates and conventional emulsion polymers significantly reduce the VOC content and have a reasonable cure speed, but yet fail to provide coatings with sufficient gloss and hardness. To solve these problems, U.S. Pat. No. 9,365,739 discloses waterborne two-component polyurethane coating compositions comprising a polyisocyanate composition and a polyol composition comprising a cycloaliphatic diol or polyol or an oligomeric diol or polyol, and an acrylic emulsion polymer prepared by emulsion polymerization of butyl acrylate, methyl methacrylate, styrene, hydroxyethyl methacrylate, and methacrylic acid. There is still room to further improve hardness. In addition, polyurethane compositions are also desirable to provide satisfactory flexibility and chemical resistance to meet industrial requirements for different applications. It would therefore be advantageous to provide a two-component polyurethane composition that provides improved hardness upon curing without compromising the above described properties.

SUMMARY OF THE INVENTION

The present invention provides a two-component polyurethane composition, particularly suitable for coatings. The polyurethane composition provides coatings made therefrom with high hardness of 2H or harder without compromising other properties including, for example, flexibility and chemical resistance properties. All these properties can be measured according to the test methods described in the Examples section.

In a first aspect, the present invention is a two-component polyurethane composition comprising,
(A) an emulsion polymer comprising, by weight based on the weight of the emulsion polymer,
  (a) greater than 15% to less than 30% of structural units of tert-butyl methacrylate,
  (b) greater than 10% of structural units of a hydroxy-functional alkyl (meth)acrylate,
  (c) structural units of a phosphorous-containing acid monomer and/or a salt thereof,
  (d) structural units of an additional acid monomer and/or a salt thereof, and
  (e) structural units of an additional monoethylenically unsaturated nonionic monomer;
  wherein the weight ratio of (d)/(c) is in the range of from 7.1:1 to 9.9:1; and
(B) a water-dispersible polyisocyanate.

In a second aspect, the present invention is a process of preparing the two-component polyurethane composition of the first aspect, comprising:
(i) providing an emulsion polymer comprising, by weight based on the weight of the emulsion polymer,
  (a) greater than 15% to less than 30% of structural units of tert-butyl methacrylate,
  (b) greater than 10% of structural units of a hydroxy-functional alkyl (meth)acrylate,
  (c) structural units of a phosphorous-containing acid monomer and/or a salt thereof,
  (d) structural units of an additional acid monomer and/or a salt thereof, and
  (e) structural units of an additional monoethylenically unsaturated nonionic monomer;
  wherein the weight ratio of (d)/(c) is in the range of from 7.1:1 to 9.9:1; and
(ii) mixing the emulsion polymer from step (i) with a water-dispersible polyisocyanate.

DETAILED DESCRIPTION OF THE INVENTION

"Aqueous" dispersion herein means that particles dispersed in an aqueous medium. By "aqueous medium" herein is meant water and from 0 to 30%, by weight based on the weight of the medium, of water-miscible compound(s) such as, for example, alcohols, glycols, glycol ethers, glycol esters, and the like.

"Structural units", also known as "polymerized units", of the named monomer, refers to the remnant of the monomer after polymerization, that is, polymerized monomer or the monomer in polymerized form. For example, a structural unit of methyl methacrylate is as illustrated:

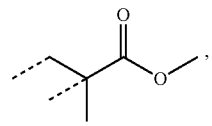

where the dotted lines represent the points of attachment of the structural unit to the polymer backbone.

As used herein, unless otherwise indicated, the term "polyisocyanate" refers to any isocyanate functional molecule having two or more isocyanate groups.

The emulsion polymer useful in the present invention may comprise (a) structural units of tert-butyl methacrylate. The emulsion polymer may comprise, by weight based on the weight of the emulsion polymer, greater than 15% and less than 30% of structural units of tert-butyl methacrylate, for example, 15.5% or more, 16.0% or more, 16.5% or more, 17.0% or more, 17.5% or more, or even 18.0% or more, and at the same time, 29.5% or less, 29.0% or less, 28.5% or less, 28.0% or less, 27.5% or less, 27.0% or less, 26.5% or less, 26.0% or less, 25.5% or less, 25.0% or less, 24.5% or less, 24.0% or less, 23.5% or less, 23.0% or less, 22.5% or less, 22.0% or less, 21.5% or less, 21.0% or less, 20.5% or less, or even 20.0% or less.

The emulsion polymer useful in the present invention is a hydroxyl group-containing polymer. The emulsion polymer may also comprise (b) structural units of one or more hydroxy-functional alkyl (meth)acrylates. Examples of suitable hydroxy-functional alkyl (meth)acrylates include hydroxyethyl (meth)acrylates including, for example, 2-hydroxyethyl acrylate and 2-hydroxyethyl methacrylate; hydroxypropyl (meth)acrylates including, for example, 2-hydroxypropylacrylate, 2-hydroxypropyl methacrylate, 3-hydroxypropyl acrylate, and 3-hydroxypropyl methacrylate; hydroxybutyl (meth)acrylates including, for example, 3-hydroxybutyl acrylate, 3-hydroxybutyl methacrylate, 4-hydroxybutyl acrylate, and 4-hydroxybutyl methacrylate; 6-hydroxyhexyl acrylate; 6-hydroxyhexylmethacrylate; 3-hydroxy-2-ethylhexyl acrylate; 3-hydroxy-2-ethylhexyl methacrylate; and mixtures thereof. Preferred hydroxy-functional alkyl (meth)acrylates include 2-hydroxyethyl acrylate, 2-hydroxyethyl methacrylate, 2-hydroxypropyl acrylate, 2-hydroxypropyl methacrylate, 3-hydroxypropyl acrylate, 3-hydroxypropyl methacrylate, or mixtures thereof. The emulsion polymer may comprise, by weight based on the weight of the emulsion polymer, greater than 10% of structural units of the hydroxy-functional alkyl (meth)acrylates, for example, 11% or more, 12% or more, 13% or more, 14% or more, 15% or more, 16% or more, 17% or more, 18% or more, 19% or more, or even 20% or more, and at the same time, 50% or less, 45% or less, 40% or less, 38% or less, 36% or less, 34% or less, 32% or less, or even 30% or less. "Weight of the emulsion polymer" refers to the dry or solids weight of the emulsion polymer.

The emulsion polymer useful in the present invention may further comprise (c) structural units of one or more phosphorous-containing acid monomers and/or salts thereof. Examples of suitable phosphorous-containing acid monomers and salts thereof include phosphoalkyl (meth)acrylates such as phosphoethyl (meth)acrylate, phosphopropyl (meth) acrylate, phosphobutyl (meth)acrylate, salts thereof, and mixtures thereof; $CH_2=C(R_1)-C(O)-O-(R_2O)_q-P(O)(OH)_2$, wherein $R_1=H$ or $CH_3$, $R_2$=alkylene, such as an ethylene group, a propylene group, or a combination thereof; and q=1-20, such as SIPOMER PAM-100, SIPOMER PAM-200, SIPOMER PAM-300, SIPOMER PAM-600 and SIPOMER PAM-4000 all available from Solvay; phosphoalkoxy (meth)acrylates such as phospho ethylene glycol (meth)acrylate, phospho di-ethylene glycol (meth)acrylate, phospho tri-ethylene glycol (meth)acrylate, phospho propylene glycol (meth)acrylate, phospho di-propylene glycol (meth)acrylate, phospho tri-propylene glycol (meth)acrylate, salts thereof, and mixtures thereof. Preferred phosphorus-containing acid monomers and salts thereof are selected from the group consisting of phosphoethyl (meth)acrylate, phosphopropyl (meth)acrylate, phosphobutyl (meth)acrylate, allyl ether phosphate, salts thereof, or mixtures thereof; more preferably, phosphoethyl methacrylate (PEM). The emulsion polymer may comprise structural units of the phosphorous-containing acid monomers and salts thereof in an amount of 0.05% or more, for example, 0.06% or more, 0.07% or more, 0.08% or more, 0.10% or more, 0.12% or more, 0.15% or more, 0.18% or more, 0.20% or more, and at the same time, 0.4% or less, 0.38% or less, 0.35% or more, 0.32% or more, 0.30% or more, 0.28% or less, 0.25% or less, or even 0.22% or less, by weight based on the weight of the emulsion polymer.

The emulsion polymer useful in the present invention may also comprise (d) structural units of one or more additional acid monomers that are different from the phosphorous-containing acid monomers, and/or salts thereof. The additional acid monomers can be carboxylic acid monomers, sulfonic acid monomers, and mixtures thereof. The carboxylic acid monomers can be α, β-ethylenically unsaturated carboxylic acids, monomers bearing an acid-forming group which yields or is subsequently convertible to, such an acid group (such as anhydride, (meth)acrylic anhydride, or maleic anhydride); and mixtures thereof. Specific examples of carboxylic acid monomers include acrylic acid, methacrylic acid, maleic acid, itaconic acid, crotonic acid, fumaric acid, 2-carboxyethyl acrylate, and mixtures thereof. The sulfonic acid monomers may include sodium vinyl sulfonate (SVS), sodium styrene sulfonate (SSS), acrylamido-methyl-propane sulfonate (AMPS) and salts thereof; or mixtures thereof. Preferably, the additional acid monomer is an α, β-ethylenically unsaturated carboxylic acid, for example, acrylic acid, methacrylic acid, itaconic acid, and mixtures thereof. The emulsion polymer may comprise, by weight based on the weight of the emulsion polymer, 0.3% or more, 0.35% or more, or even 0.40% or more, and at the same time 4.0% or less, 3.8% or less, 3.5% or less, 3.3% or less, 3.2% or less, 3.1% or less, 3.0% or less, 2.9% or less, 2.8% or less, 2.7% or less, 2.6% or less, 2.5% or less, 2.4% or less, 2.3% or less, 2.2% or less, 2.1% or less, 2.0% or less, 1.9% or less, 1.8% or less, 1.7% or less, or even 1.6% or less of structural units of the additional acid monomer and salt thereof. The weight ratio of structural units of the additional acid monomer and salt thereof to structural units of the phosphorous-containing acid monomer and salt thereof, i.e., the weight ratio of (d)/(c), may be in the range of from 7.1:1 to 9.9:1, for example, 7.1:1 or higher, 7.2:1 or higher, 7.3:1 or higher, 7.4:1 or higher, 7.5:1 or higher, 7.6:1 or higher, 7.7:1 or higher, 7.8:1 or higher, 7.9:1 or higher, or even 8.0:1 or higher, and at the same time, 9.9:1 or lower, 9.8:1 or lower, 9.7:1 or lower, 9.6:1 or lower, 9.5:1 or lower, 9.4:1 or lower, 9.3:1 or lower, 9.2:1 or lower, 9.1:1 or lower, or even 9.0:1 or lower.

The emulsion polymer useful in the present invention may also comprise structural units of one or more ethylenically unsaturated monomers carrying at least one of functional groups selected from an amide, acetoacetate, carbonyl, ureido, silane, or amino group, or combinations thereof (hereinafter "functional-group-containing monomer"). Suitable functional-group-containing monomers may include, for example, amino-functional monomers such as dimethylaminoethyl methacrylate, dimethylaminoethyl acrylate, dimethylaminopropyl methacrylate, dimethylaminopropyl acrylate; ureido-functional monomers such as hydroxyethyl ethylene urea methacrylate, hydroxyethyl ethylene urea acrylate, such as SIPOMER WAM II; monomers bearing acetoacetate-functional groups such as acetoacetoxyethyl methacrylate (AAEM), acetoacetoxyethyl acrylate, acetoacetoxypropyl methacrylate, acetoacetoxypropyl acrylate, allyl acetoacetate, acetoacetoxybutyl methacrylate, acetoacetoxybutyl methacrylate, acetoacetamidoethyl methacrylate, acetoacetamidoethyl acrylate; monomers bearing carbonyl-containing groups such as diacetone acrylamide (DAAM), diacetone methacrylamide; monomers bearing amide-functional groups such as acrylamide and methacrylamide; vinyltrialkoxysilanes such as vinyltrimethoxysilane, vinyltriethoxysilane, vinyltris(2-methoxyethoxy)silane, vinyldimethylethoxysilane vinylmethyldiethoxysilane or (meth) acryloxyalkyltrialkoxysilanes such as (meth) acryloxyethyltrimethoxysilane and (meth) acryloxypropyltrimethoxysilane; and mixtures thereof. The emulsion polymer may comprise, by weight based on the weight of the emulsion polymer, from zero to 10% of structural units of the functional-group-containing monomer, for example, from 0.1% to 8%, from 0.5% to 6%, from 1% to 5%, or from 2% to 3%.

The emulsion polymer useful in the present invention may also comprise structural units of one or more additional monoethylenically unsaturated nonionic monomers that are different from the monomers described above. "Nonionic monomers" herein refers to monomers that do not bear an ionic charge between pH=1-14. The additional monoethylenically unsaturated nonionic monomers may include vinyl aromatic monomers, alkyl (meth)acrylates, acrylonitrile, and mixtures thereof. Suitable vinyl aromatic monomers may include, for example, styrene; substituted styrene such as methylstyrene, alpha-methylstyrene, trans-beta-methylstyrene, 2, 4-dimethylstyrene, ethylstyrene, butylstyrene, and p-methoxystyrene; o-, m-, and p-methoxystyrene; and p-trifluoromethylstyrene; or mixtures thereof. The alkyl (meth)acrylates can be $C_1$-$C_{20}$-alkyl, $C_1$-$C_{18}$-alkyl, $C_1$-$C_{12}$-alkyl, or $C_1$-$C_4$-alkyl (meth)acrylates. Specific examples of alkyl (meth)acrylates include methyl acrylate, methyl methacrylate, ethyl acrylate, ethyl methacrylate, butyl acrylate, butyl methacrylate, tert-butyl acrylate, iso-butyl acrylate, iso-butyl methacrylate, 2-ethylhexyl acrylate, nonyl acrylate, decyl acrylate, lauryl acrylate, cyclohexyl methacrylate, cyclohexyl acrylate, tert-butyl cyclohexyl methacrylate, trimethylcyclohexyl methacrylate, isobornyl methacrylate, isobornyl acrylate, tetrahydrofuran methacrylate, dicyclopentadienyl acrylate, dicyclopentadienyl methacrylate, and combinations thereof. The additional monoethylenically unsaturated nonionic monomers preferably include styrene in combination of one or more alkyl (meth) acrylates. Preferred additional monoethylenically unsaturated nonionic monomers are styrene, methyl methacrylate, 2-ethylhexyl acrylate, butyl acrylate, or mixtures thereof. The emulsion polymer may comprise, by weight based on the weight of the emulsion polymer, 25% or more, 30% or more, 35% or more, 37% or more, 40% or more, 45% or more, or even 48% or more, and at the same times, 74.9% or less, 74.5% or less, 72% or less, 70% or less, 69.5% or less, 68% or less, or even 65% or less of structural units of the additional monoethylenically unsaturated nonionic monomer.

The emulsion polymer useful in the present invention may further comprise structural units of one or more multiethylenically unsaturated monomers including di-, tri-, tetra-, or higher multifunctional ethylenically unsaturated monomers. Examples of suitable multiethylenically unsaturated monomers include butadiene, allyl (meth)acrylate, divinyl benzene, ethylene glycol dimethacrylate, butylene glycol dimethacrylate, and mixtures thereof. The emulsion polymer may comprise, by weight based on the weight of the emulsion polymer, from zero to 5% of structural units of the multiethylenically unsaturated monomer, for example, 3% or less, 2% or less, 1% or less, 0.5% or less, or even zero.

In some embodiments, the emulsion polymer comprises, by weight based on the weight of the emulsion polymer,
(a) from 18% to 25% of structural units of tert-butyl methacrylate,
(b) from 12% to 35% of structural units of the hydroxy-functional alkyl (meth)acrylate,
(c) structural units of the phosphorous-containing acid monomer and/or the salt thereof,
(d) structural units of the additional acid monomer and/or the salt thereof, and
(e) from 37% to 69.5% of structural units of the additional monoethylenically unsaturated nonionic; wherein the weight ratio of (d)/(c) is in the range of from 7.5:1 to 9.5:1, more preferably in the range of from 7.5:1 to 8.5:1.

The emulsion polymer useful in the present invention may have a weight average molecular weight of from 4,000 g/mol to 2,000,000 g/mol, from 6,000 g/mol to 1,000,000 g/mol, from 7,000 g/mol to 500,000 g/mol, from 8,000 g/mol to 400,000 g/mol, or from 9,000 g/mol to 100,000 g/mol. Weight average molecular weight of the emulsion polymer herein can be determined by Gel Permeation Chromatography (GPC) as described in the Examples section below.

The emulsion polymer useful in the present invention typically present in the form of an aqueous dispersion in an amount of from 20% to 70%, from 30% to 55%, from 35% to 50%, or from 40% to 45%, by dry or solids weight based on the total weight of the aqueous dispersion. The emulsion polymer particles may have a particle size of from 30 to 500 nanometers (nm), for example, 50 nm or more, 60 nm or more, 70 nm or more, or even 80 nm or more, and at the same time, 400 nm or less, 300 nm or less, 200 nm or less, or even 150 nm or less. The particle size may be measured by a Brookhaven BI-90 Plus Particle Size Analyzer as described in the Examples section below.

Types and levels of the monomers described above may be chosen to provide the obtained emulsion polymer with a glass transition temperature (Tg) suitable for different applications. The emulsion polymer may have a measured Tg in the range of from 15 to 85° C., from 20 to 80° C., from 25 to 70° C., from 25 to 60° C., or from 30 to 55° C. By "measured Tg" as used herein, is meant the glass transition temperature as determined by differential scanning calorimetry (DSC) according to the test method described in the Examples section below.

The emulsion polymer useful in the present invention may be prepared by emulsion polymerization, of the monomers described above, in an aqueous medium, preferably in the presence of one or more surfactants. Monomers may be added neat or as an emulsion in water; or added in one or more additions or continuously, linearly or nonlinearly, over the reaction period of preparing the emulsion polymer. Total weight concentration of the monomers described above for preparing the emulsion polymer may be equal to 100%. The dosage of such monomer based on the total weight of the monomers, can be the same as the amount of each of these monomers as structural units in the emulsion polymer, based on the weight of the emulsion polymer. Total weight concentration of the structural units of the monomers in the emulsion polymer may be equal to 100%. For example, the monomers for preparing the emulsion polymer may comprise, by weight based on the total weight of the monomers, greater than 15% to less than 30% of tert-butyl methacrylate, greater than 10% of the hydroxy-functional alkyl (meth) acrylate, the phosphorous-containing acid monomer and/or the salt thereof, the additional acid monomer and/or the salt thereof, and the additional monoethylenically unsaturated nonionic monomer. The surfactants useful in the polymerization process can be ionic surfactants, nonionic surfactants, polymerizable surfactant, or combinations thereof. Examples of suitable surfactants include alkali metal or ammonium salts of alkyl, aryl, or alkylaryl sulfates, sulfonates or phosphates; alkyl sulfonic acids; sulfosuccinate salts; fatty acids; ethylenically unsaturated surfactant monomers; ethoxylated alcohols or phenols; and mixtures thereof. In some preferred embodiments, the alkali metal or ammonium salts of alkyl, aryl, or alkylaryl sulfates surfactant are used. The surfactant may be added prior to or during the polymerization of the monomers, or combinations thereof. A portion of the surfactant can also be added after the polymerization. These surfactants may be used in a combined amount of zero to 10%, from 0.1% to 5%, from 0.2% to 3%, or from 0.8% to 2.0%, or from 1.0% to 1.5%, by weight based on the total weight of the monomers for preparing the emulsion polymer.

Temperature suitable for polymerization of the monomers may be lower than 100° C., in the range of from 10 to 95° C., or in the range of from 50 to 92° C. Multistage emulsion polymerization using the monomers described above can be used, which at least two stages are formed sequentially, and usually results in the formation of the multistage polymer comprising at least two polymer compositions.

Free radical initiators may be used in the polymerization process. The polymerization process may be thermally initiated or redox initiated emulsion polymerization. Examples of suitable free radical initiators include hydrogen peroxide, t-butyl hydroperoxide, cumene hydroperoxide, ammonium and/or alkali metal persulfates, sodium perborate, perphosphoric acid, and salts thereof; potassium permanganate, and ammonium or alkali metal salts of peroxydisulfuric acid. The free radical initiators may be used typically at a level of 0.01 to 3.0% by weight, based on the total weight of the monomers. Redox systems comprising the above described initiators coupled with a suitable reductant may be used in the polymerization process. Examples of suitable reductants include sodium sulfoxylate formaldehyde, ascorbic acid, isoascorbic acid, alkali metal and ammonium salts of sulfur-containing acids, such as sodium sulfite, bisulfite, thiosulfate, hydrosulfite, sulfide, hydrosulfide or dithionite, acetone bisulfite, glycolic acid, hydroxymethanesulfonic acid, glyoxylic acid hydrate, lactic acid, glyceric acid, malic acid, tartaric acid and salts of the preceding acids. Metal salts of iron, copper, manganese, silver, platinum, vanadium, nickel, chromium, palladium, or cobalt may be used to catalyze the redox reaction. Chelating agents for the metals may optionally be used.

One or more chain transfer agents may be used in the polymerization process to control the molecular weight of the emulsion polymer. Examples of suitable chain transfer agents include 3-mercaptopropionic acid, methyl 3-mercaptopropionate, butyl 3-mercaptopropionate, n-dodecyl mercaptan, n-hexadecanethiol, tert-dodecyl mercaptan, n-octadecanethiol, benzenethiol, azelaic alkyl mercaptan, hydroxy group containing mercaptans such as hydroxyethyl mercaptan, mercaptopropionic acid, and mixtures thereof. The chain transfer agent may be used in an amount of from zero to 10%, from 0.2% to 8%, from 0.4% to 5%, from 0.5% to 4%, from 1% to 3.5%, from 1.3% to 3.0%, from 1.7% to 2.5%, or from 1.8% to 2.3%, by weight based on the total weight of the monomers.

After completing the polymerization process, the obtained aqueous dispersion may be neutralized by one or more bases to a pH value, for example, at least 5, from 6 to 10, from 6.2 to 9, from 6.4 to 8, from 6.6 to 7.5. Examples of suitable bases include ammonia; alkali metal or alkaline earth metal compounds such as sodium hydroxide, potassium hydroxide, calcium hydroxide, zinc oxide, magnesium oxide, sodium carbonate; primary, secondary, and tertiary amines, such as triethyl amine, ethylamine, propylamine, monoisopropylamine, monobutylamine, hexylamine, ethanolamine, 2-amino-2-methyl-1-propanol, diethyl amine, dimethyl amine, di-npropylamine, tributylamine, triethanolamine, dimethoxyethylamine, 2-ethoxyethylamine, 3-ethoxypropylamine, dimethylethanolamine, diisopropanolamine, morpholine, ethylenediamine, 2-diethylaminoethylamine, 2,3-diaminopropane, 1,2-propylenediamine, neopentanediamine, dimethylaminopropylamine, hexamethylenediamine, 4,9-dioxadodecane-1,12-diamine; aluminum hydroxide; or mixtures thereof.

The polyurethane composition of the present invention may also comprise one or more polyols having two or more hydroxyl groups per molecule. Polyols useful in the present application may include polyether diols, polyester diols, polycarbonate polyols, multi-functional polyols, or mixtures thereof. The polyols may be selected from polyether polyols, polyester polyols, polycarbonate polyols, or mixtures thereof. The polyether polyols useful the present application may contain a —C—O—C— group. They can be obtained by reacting starting compounds that contain reactive hydrogen atoms such as water or diols, with alkylene oxides such as ethylene oxide, propylene oxide, butylene oxide, styrene oxide, tetrahydrofuran, epichlorohydrin, or mixtures thereof. Preferred polyether polyols include poly(propylene glycol) with a molecular weight of from 400 to 3,000, polytetrahydrofuran and copolymers of poly(ethylene glycol) and poly(propylene glycol). The diols useful in the present application may include alkylene glycols, preferably ethylene glycol, diethylene glycol and butylene glycol. The polyester polyols useful in preparing the polyurethane are typically esterification products prepared by the reaction of organic polycarboxylic acids or their anhydrides with a stoichiometric excess of a diol(s). Examples of suitable polyester polyols useful in preparing the polyurethane include poly(glycol adipate), poly(ethylene terephthalate) polyols, polycaprolactone polyols, alkyd polyols, orthophthalic polyols, sulfonated and phosphonated polyols, and the mixture thereof. The diols useful in preparing the polyester polyols include those described above for preparing the polyether polyols. Suitable carboxylic acids useful in preparing the polyester polyols may include dicarboxylic acids, tricarboxylic acids and anhydrides, such as maleic acid, maleic anhydride, succinic acid, glutaric acid, glutaric anhydride, adipic acid, suberic acid, pimelic acid, azelaic acid, sebacic acid, chlorendic acid, 1,2,4-butane-tricarboxylic acid, phthalic acid, the isomers of phthalic acid, phthalic anhydride, fumaric acid, dimeric fatty acids such as oleic acid, and the like, or mixtures thereof. Preferred polycarboxylic acids useful in preparing the polyester polyols include aliphatic and aromatic dibasic acids.

Suitable polyols may comprise any cycloaliphatic polyol having a molecular weight of from 100 to 500 and containing one or more 4 to 7 member aliphatic ring, or any oligomeric diol or polyol made from a cycloaliphatic polyol having a molecular weight of from 100 to 500 and comprising at least 30% by weight of cycloaliphatic diol and/or polyol and having a weight average molecular weight of from 200 to 3000, from 200 to 2000, or from 200 to 1000. Examples of such polyols include cyclohexanedimethanol (CHDM), especially 1,3 CHDM, 1,4 CHDM, mixtures thereof, dianhydro-d-glucitol, which has two 5 membered rings, each containing an oxygen atom, 4,8-Bis(hydroxymethyl)tricyclo [5.2.1.02,6] decane, and 2,2,4,4-tetramethyl cyclobutanediol, containing a 4 membered ring.

Oligomeric polyols useful in the present invention may include any oligomers comprising the condensation reaction product of at least 30% preferably, at least 40%, by weight based on the total weight of reactants used to make the oligomer, of, any cycloaliphatic polyol having a molecular weight of from 100 to 500 and containing one or more 4 to 7 member aliphatic ring. These oligomeric polyols may include, for example, oligo- or polyesters, short chain alkyds, oligo- or polycarbonates, oligo- or polyethers and oligo- or polylactones having the desired low weight average molecular weight, for example, from 200 to 3000, from 200 to 2000, or from 200 to 1000. Such oligomers may be made by conventional means, such as by bulk polymerization. For example, polyesters may be made, e.g. from diacids or difunctional anhydrides or their salts cycloaliphatic diols or triols having one or more 4 to 7 member aliphatic rings. Likewise, other oligomers may be formed by reacting any cycloaliphatic polyol having a molecular weight of from 100 to 500 and containing one or more 4 to 7 member aliphatic ring in the presence of lactone reactants, e.g. caprolactone, to make polylactone polyols, or in the presence of carbonate reactants, e.g. trimethylene carbonate, to make polycarbonate polyols. An example of a suitable polyester polyol was made by condensing 2 CHDM molecules and 1 oxalic acid molecule, for which the polyol content was calculated as 76.2% by weight. Commercially available polyols may include, for example, K-Flex 188 and K-Flex A308 polyester polyols from King Industries, Inc. (Norwalk, Conn.); UNOXOL™ diol, a mixture of 1,3 CHDM and 1,4 CHDM (The Dow Chemical Company, UNOXOL is a trademark of The Dow Chemical Company); and Polysorb P dianhydro-d-glucitol (Roquette, Lestrem, FR). As used herein the term "molecular weight" when referring to a cycloaliphatic polyol refers to the mass of one mole of that cycloaliphatic polyol in grams. As used herein, the term "molecular weight" of other polyols is a weight average molecular weight of a sample of that polyols as determined by GPC of the sample in tetrahydrofuran solvent as against a polystyrene molecular weight standard as calibration standard. EasiCal PS-2 standard (Agilent Technologies, Inc, Santa Clara, Calif) against a polystyrene standard.

The polyols included in the polyurethane composition are either in neat form (for water-soluble polyols), or for less water-soluble polyols, are preferably micronized and stabilized with a stabilizing amount of a surfactant, preferably at a concentration in the range of about 0.5 to 5%, by weight based on total weight of the diols or polyols. Nonionic surfactants are preferred and may include those described above in the preparation of the emulsion polymer section above. These polyols may be present in an amount of from zero to 20%, from 0.1% to 15%, or from 0.2% to 10%, by weight based on the total solids weight of polyols and the emulsion polymer.

The polyurethane composition of the present invention further comprises one or more water-dispersible polyisocyanates useful as crosslinkers. The polyisocyanates useful in the present invention may include any molecule having 2 or more isocyanate groups and that can be dispersed in or dissolved in water at room temperature, and mixtures thereof. Such polyisocyanates can be aliphatic, alicyclic, aromatic or mixtures thereof. The polyisocyanate may have an average functionality of >2 or from 2.5 to 10. Examples of suitable water-dispersible polyisocyanates include aliphatic diisocyanates, as well as dimers and trimers thereof, such as, for example, $C_2$-$C_8$ alkylene diisocyanates, such as tetramethylene diisocyanate and hexamethylene diisocyanate (HDI), 1,12-dodecane diisocyanate, 2,2,4-trimethyl-hexamethylene diisocyanate, 2,4,4-trimethyl-hexamethylene diisocyanate, 2-methyl-1,5-pentamethylene diisocyanate; alicyclic diisocyanates, as well as dimers and trimers thereof, such as, for example, isophorone diisocyanate (IPDI) and dicyclohexyl methane diisocyanate (HMDI), 1,4-cyclohexane diisocyanate, and 1,3-bis-(isocyanatomethyl)cyclohexane; aromatic diisocyanates, as well as dimers and trimers thereof, such as, for example, toluene diisocyanate (TDI), and diphenyl methane diisocyanate (MDI). Preferably, the polyisocyanate comprises aliphatic polyisocyanates. More preferably, the polyisocyanates are hexamethylene diisocyanate homopolymers, hexamethylene diisocyanate adducts, isophorone diisocyanate homopolymers, isophorone diisocyanate adducts, or mixtures thereof. The trimers (or isocyanurates) in the polyisocyanate may be prepared by methods known in the art, for example, as disclosed in U.S. patent publication no. 2006/0155095A1, to Daussin et al., by trimerizing an alicyclic diisocyanate (e.g. isophorone diisocyanate) in the presence of one or more trimerization catalyst, such as, for example, a tertiary amine or phosphine or a heterogeneous catalyst, and, if desired, in the presence of solvents and/or assistants, such as co-catalysts, expediently at elevated temperature, until the desired isocyanate (NCO) content has been reached, and then deactivating the catalyst using inorganic and organic acids, the corresponding acid-halides and alkylating agents and, preferably, heating. Isocyanurate compositions containing isocyanurates from aliphatic diisocyanates may likewise be formed by cyclizing aliphatic diisocyanates in the presence of one or more trimerization catalyst and then deactivating the catalyst. Any of the isocyanurates can be further modified by conventional methods to contain urethane, urea, imino-s-triazine, uretonimine or carbodiimide moieties. Other suitable polyisocyanates may include, for example, polyether modified polyisocyanates, such as, for example, a polyalkoxylated isocyanurate having two isocyanate groups.

The polyisocyanate useful in the present invention may include one or more polyisocyanate prepolymers, which may be formed by reaction of bis(isocyanotomethyl)cyclohexane and/or another aliphatic diisocyanate with a monol, diol, diamine, or monoamine, which is then modified by the reaction of additional isocyanate to form allophanate or biuret modified prepolymers. Such prepolymers may further comprise a polyalkoxy or polyether chain. Alternatively, such prepolymers can then be mixed with a trimerization catalyst giving an allophanate or biuret modified polyisocyanate isocyanurate compositions. Preparation of such allophanate or biuret prepolymers, followed by trimerization, is known in the art, see for example, U.S. Pat. Nos. 5,663,272 and 6,028,158. Still further, suitable polyisocyanates may be modified by an aminosulfonic acid.

The polyurethane composition of the present invention may comprise equivalent ratios of the total number of isocyanate group equivalents in the polyisocyanates, which may contain several different polyisocyanates, to the total number of hydroxyl group equivalents in the emulsion polymer and optionally, polyols, in the range of, for example, from 0.7:1 to 4:1, from 0.8:1 to 3.5:1, from 0.8:1 to 3:1, from 0.9:1 to 2.5:1, from 0.9:1 to 2:1, from 1:1 to 1.7:1, or from 1.3:1 to 1.5:1.

The polyurethane composition of the present invention may optionally comprise one or more surfactants as described above, which may be introduced during the polymerization of the emulsion polymer, or post added in the preparation of the polyurethane composition. The surfactant may be present, by weight based on the weight of the emulsion polymer, in an amount of from zero to 10%, from 0.1% to 5%, from 0.2% to 3%, or from 0.8% to 1.5%.

The polyurethane composition of the present invention may further comprise one or more catalyst to enhance curing. The catalyst can be any suitable catalyst for two-component waterborne polyurethane composition. Examples include metal based catalysts such as tin-, bismuth-, zinc-, aluminum-, zirconium-containing catalysts or tertiary amine catalysts including aliphatic and cyclo-aliphatic tertiary amine catalysts which are mono-, di- or tri-amines, and mixtures thereof. Examples of suitable metal based catalysts may include, for example, dibutyltin dilaurate, dibutyltin mercaptide, dibutyltin sulfide, dimethyltin mercaptide, dibutyltin mercaptoester, zirconium dionate, Al dionate, bismuth neodecanoate, and zinc amine compounds. Tertiary amine catalysts may include, for example, triethylene diamine, triethylene amine, 1,4-diazabicyclo [2.2.2] octane, 6-(dibutylamino)-1,8-diazabicyclo[5.4.0]undec-7-ene, dimethyl cyclohexyl amine and etc. The catalyst may be present in an amount of from 0.01% to 2.5% or from 0.1% to 1.0%, by weight based on the total polyisocyanate and hydroxy group-containing component (e.g., the emulsion polymer, and optionally the polyols) solids.

The polyurethane composition of the present invention may further comprise one or more pigments. As used herein, the term "pigment" refers to a particulate inorganic material which is capable of materially contributing to the opacity or hiding capability of a coating. Such materials typically have a refractive index greater than 1.8. Examples of suitable pigments include titanium dioxide ($TiO_2$), zinc oxide, zinc sulfide, iron oxide, barium sulfate, barium carbonate, or mixtures thereof. Preferred pigment is $TiO_2$. The polyurethane composition may also comprise one or more extenders. The term "extender" refers to a particulate inorganic material having a refractive index of less than or equal to 1.8 and greater than 1.3. Examples of suitable extenders include calcium carbonate, aluminium oxide ($Al_2O_3$), clay, calcium sulfate, aluminosilicate, silicate, zeolite, mica, diatomaceous earth, solid or hollow glass, ceramic bead, and opaque polymers such as ROPAQUE™ Ultra E available from The Dow Chemical Company (ROPAQUE is a trademark of The Dow Chemical Company), or mixtures thereof. The polyurethane composition may have a pigment volume concentration (PVC) of from zero to 75%, from 5% to 50%, or from 10% to 30%. PVC may be determined according to the following equation:

$$PVC = \frac{\text{Volume of Pigment and extender}}{\text{Dry volume of the coating composition}} \times 100\%.$$

The polyurethane composition of the present invention may further comprise one or more matting agents, such as, a silica matting agent, a polyurea matting agent, silicone matting agent, or mixtures thereof. Suitable commercially available matting agents include, for example, ACEMATT TS-100, 3300 and OK520 silica matting agents all available from Evonik, DEUTERON™ MK polyurea matting agent available from Deuteron, SYLOID Silica 7000 matting agent available from Grace Davison, DOWSIL™ IE3301 matting agent available from The Dow Chemical Company (DOWSIL is a trademark of The Dow Chemical Company), or mixtures thereof.

The polyurethane composition of the present invention may further comprise conventional additives such as, for example, colorants, light stabilizers, ultraviolet (UV) absorbing compounds, leveling agents, wetting agents, dispersants, anti-scratch additives, coalescents, neutralizers, defoamers, or rheology modifiers. These additives may be present in an amount of from zero to 20%, from 1 to 10%, by weight based on the weight of the polyurethane composition.

The polyurethane composition of the present invention may be prepared with techniques known in the art. A process for preparing the polyurethane composition typically comprises mixing the emulsion polymer (also known as "component A"), typically in an aqueous dispersion, and optionally, the polyols, pigments, and other additives, along with the water-dispersible polyisocyanate (also known as "component B") immediately before application. Curing temperatures for the polyurethane composition may be varied depending on the substrate, for example, at temperatures ranging from 4 to 150° C., preferably, from room temperature to 80° C. Examples of suitable substrates include concrete, cementious substrates, wood, metals, stones, asphalt, plastics, elastomeric substrates, glass or fabrics.

The polyurethane composition of the present invention is useful for producing coatings, with or without a pigment or an extender, an adhesive, a sealant, a primer, or a caulk composition. The polyurethane composition can provide coatings made therefrom with a hardness of 2H or harder. The polyurethane composition may also provide coatings with satisfactory chemical resistance properties including acid resistance rating of at least 4, alcohol resistance rating of at least 4, and alkali resistance rating of at least 4; and impact resistance of at least 20 centimeters (cm). All these properties can be measured according to the test methods described in the Examples section below.

The present invention further provides polyurethane coatings made from the two-component polyurethane composition on any of the substrates mentioned above. Such coatings can be multilayer coatings over a primer layer and, optionally, a basecoat or color coat. The coatings can be architecture coatings, general industrial finish coatings, marine and protective coatings, automotive coatings, auto refinish coatings, plastic coatings, wood coatings, coil coatings, and civil engineering coatings.

EXAMPLES

Some embodiments of the invention will now be described in the following Examples, wherein all parts and percentages are by weight unless otherwise specified.

Styrene (ST), 2-ethylhexyl acrylate (EHA), methacrylic acid (MAA), methyl methacrylate (MMA), hydroxyethyl methacrylate (HEMA), hydroxypropyl methacrylate (HPMA), iso-Butyl methacrylate (IBMA), butyl methacrylate (BMA), n-Dodecyl mercaptan (n-DDM), and ammonia persulfate (APS) are all available from Sinoreagent Group.

Phosphoethyl methacrylate (PEM), isobornyl methacrylate (IBOMA), and N, N-dimethyl ethanol amine (DMEA) are available from Solvay.

tert-Butyl methacylate (tBMA) and cyclohexyl methacrylate (CHMA) are available from BASF.

Disponil FES 993 surfactant, available from BASF, is a fatty alcohol polyglycol ether sulphate, sodium salt.

The following standard analytical equipment, test methods and synthesis process are used in the Examples.

Particle Size Measurement

The particle size of polymer particles in an aqueous dispersion was measured by using Brookhaven BI-90 Plus Particle Size Analyzer, which employs the technique of photon correlation spectroscopy (light scatter of sample particles). This method involved diluting 2 drops of an aqueous dispersion to be tested in 20 mL of 0.01 M sodium chloride (NaCl) solution, and further diluting the resultant mixture in a sample cuvette to achieve a desired count rate (K) (e.g., K ranging from 250 to 500 counts/sec for diameter in the range of 10-300 nm). Then the particle size of the aqueous polymer dispersion was measured and reported as a Z-average diameter by intensity.

Tg Measurement

Tg was measured by DSC. A 5-10 milligram (mg) sample was analyzed in a sealed aluminum pan on a TA Instrument DSC Q2000 fitted with an auto-sampler under a nitrogen ($N_2$) atmosphere. Tg measurement by DSC was with three cycles including, from −40 to 180° C., 10° C./min ($1^{st}$ cycle, then hold for 5 minutes to erase thermal history of the sample), from 180 to −40° C., 10° C./min ($2^{nd}$ cycle), and from −40 to 180° C., 10° C./min ($3^{rd}$ cycle). The measured Tg was obtained from the $3^{rd}$ cycle by taking the mid-point in the heat flow versus temperature transition as the Tg value.

GPC Analysis

GPC analysis of an emulsion polymer was performed generally by Agilent 1200. A sample was dissolved in tetrahydrofuran (THF)/formic acid (FA) (5%) with a concentration of 2 mg/mL and then filtered through 0.45 μm polytetrafluoroethylene (PTFE) filter prior to GPC analysis. The GPC analysis was conducted using the following conditions:

Column: Two Mixed B columns (7.8 mm×300 mm) in tandem; column temperature: 35° C.; mobile phase: THF/FA (5%); flow rate: 1.0 mL/minute; Injection volume: 100 μL; detector: Agilent Refractive Index detector, 35° C.; and calibration curve: PL Polystyrene Narrow standards (Part No.:2010-0101) with PS equivalent molecular weights ranging from 2329000 to 162 g/mol.

Pencil Hardness

Pencil hardness was tested according to GB/T 23999-2009 standard on coatings made as disclosed below on a glass substrate. The GB/T 23999-2009 standard herein is the national standard for water based coatings for woodenware for indoor decorating and refurbishing, which was published by General Administration of Quality Supervision, Inspection and Quarantine of the People's Republic of China (P. R. China) and Standardization Administration of the P. R. China on Jun. 2, 2009 and put into effect on Feb. 1, 2010.

A two-component polyurethane composition was first drawn down on a glass substrate at 120 μm wet thickness, dried at room temperature for 20 minutes (min), and then further dried at 50° C. for 2 days. The resultant coating film was used for pencil hardness testing. The hardness of the hardest pencil lead that did not leave a mark on the coating film was recorded as the pencil hardness. A hardness of 2H or harder is acceptable.

Chemical Resistance

Chemical resistance including alcohol resistance, acid resistance, and alkali resistance of coatings was determined according to BS EN 12720:2009. Panels were prepared by first brush applying ROSHIELD™ 3311 acrylic emulsion (The Dow Chemical Company, ROSHIELD is a trademark of The Dow Chemical Company) on wood at 80-90 g/m², and then were left at room temperature (RT) for 4 hours to form a first coat, followed by sanding with sand paper. A coating composition to be tested was further applied on the first coat at 80-90 g/m², and then the obtained panels with coatings were allowed to dry at room temperature (23±2° C.) for 30 min then in an oven at 50° C. for 48 hours before evaluating alcohol resistance, acid resistance and alkali resistance, respectively.

Alcohol Resistance

Disc type filter paper was saturated with an aqueous solution of ethanol (48%), placed on the above the test coatings, and covered with a cap to reduce evaporation. After 1 hour the cap and filter paper were removed. The test area was wiped with facial tissues and allowed to dry at room temperature for another 1 hour. The test area was then observed and rated for damage degree on a scale of 0-5, where 0 is the worst, and 5 is the best. An acceptable alcohol resistance rating is 4 or higher. The higher the rating, the better the alcohol resistance.

Acid Resistance

Disc type filter paper was saturated with an aqueous solution of glacial acetic acid (10%), placed on the above the test coatings, and covered with a cap to reduce evaporation. After 16 hours, the cap and filter paper were removed. The test area was wiped with facial tissues and allowed to dry at room temperature for another 1 hour. The test area was then observed and rated for damage degree on a scale of 0-5, where 0 is the worst, and 5 is the best. An acceptable acid resistance rating is 4 or higher. The higher the rating, the better the acid resistance.

Alkali Resistance

Disc type filter paper was saturated with an aqueous solution of sodium carbonate (10%), placed on the above the test coatings, and covered with a cap to reduce evaporation. After 16 hours, the cap and filter paper were removed. The test area was wiped with facial tissues and allowed to dry at room temperature for another 1 hour. The test area was then observed and rated for damage degree on a scale of 0-5, where 0 is the worst, and 5 is the best. An acceptable alkali resistance rating is 4 or higher. The higher the rating, the better the alkali resistance.

Ratings for alcohol resistance, acid resistance, and alkali resistance are shown as below, 5: No change: test area indistinguishable from adjacent surrounding area.

4: Slight change: test area distinguishable from adjacent surrounding area, only when the light source is mirrored on the test surface and is reflected towards the observer's eyes, e.g., discoloration, change in gloss and color, and no change in structure of surface, e.g., swelling, fiber raising, cracking and blister;

3: Moderate change: test area distinguishable from adjacent surrounding area, visible in all viewing directions, e.g., discoloration, change in gloss and color, and no change in structure of surface, e.g., swelling, fiber raising, cracking and blister;

2: Significant change: test area clearly distinguishable from adjacent surrounding area, visible in all viewing directions, e.g., discoloration, change in gloss and color, and/or structure of surface slightly changed, e.g., swelling, fiber raising, cracking and blister;

1: Strong change: the structure of surface being distinctly changed, and/or discoloration, change in gloss and color, and/or the surface being totally or partially removed, and/or the filter paper adhering to the surface.

Impact Resistance

Impact resistance of coating films was determined according to the GB/T 23999-2009 standard (6.4.12). A coating composition was applied on a tin plate at a wet thickness of 120 μm, dried at room temperature for 30 min, and then put it into an oven at 50° C. for 48 hours prior to the impact resistance testing. An impact hammer (weight: 0.907 kg (2 lb)) with a spherical head with a diameter of 12.7 mm was applied. At least 3 points of the obtained coating film on the plate were tested. Deformation area of the coating film after the testing was observed by the naked eye. The highest drop height of the hammer that causes no peeling or cracking on at least three points of the coating film is recorded. An acceptable impact resistance is 20 cm or higher.

Example (Ex) 1

Fes 993 surfactant (42.04 g, 30% active) was dissolved in DI water (202.31 g), with stirring. Then ingredients listed in Table 1-1 were slowly added to the resultant agitated solution to obtain a monomer emulsion (ME). A solution containing Fes 993 surfactant (7.41 g, 30% active) and DI water (594 g) was placed in the 3 L flask and heated to 86° C. under $N_2$. An aqueous initiator solution of APS (1.12 g APS in 10.2 g DI water), and 4.00% of the ME were added to the flask. DI water (10.32 g) was used to rinse the above vessels. In about 5 min, initiation of polymerization was confirmed by the increase of temperature by 3° C. and a change of the external appearance of the reaction mixture. After heat generation ended, a solution of $Na_2CO_3$ (1.12 g in 15.00 g DI water) was charged into the flask. Then the remainder of the ME was added gradually to the flask over 120 min, with stirring. At the same time, an aqueous initiator solution of APS (1.12 g in 55.18 g DI water) was gradually added to the flask over 120 min. Polymerization reaction temperature was maintained at 84-86° C. After the addition was completed, a rinse of DI water (48 g) was added back to the flask. Upon completing the addition, the reaction mixture was held at 70° C. for 60 min. The reaction was then cooled to 50° C. and then neutralized to pH 7.0-8.5 by DMEA (50%). The mixture in the flask was held at 45-50° C. for 10 min and then cooled to room temperature to get a polymer emulsion.

Ex 2

Fes 993 surfactant (48.88 g, 30% active) was dissolved in DI water (235.25 g), with stirring. Then ingredients listed in Table 1-1 were slowly added to the resultant agitated solution to obtain a monomer emulsion (ME). A solution containing Fes 993 surfactant (8.62 g, 30% active) and DI water (741.42 g) was placed in the 3 L flask and heated to 86° C. under $N_2$. An aqueous initiator solution of APS (1.30 g in 9.55 g DI water), and 4.00% of the ME were added to the flask. DI water (12 g) was used to rinse the above vessels. In about 5 min, initiation of polymerization was confirmed by the increase of temperature by 3° C. and a change of the external appearance of the reaction mixture. After heat generation ended, a solution of $Na_2CO_3$ (1.30 g in 15.28 g DI water) was charged into the flask. Then the remainder of the ME was added gradually to the flask over 120 min, with stirring. At the same time, an aqueous initiator solution of APS (1.30 g in 64.16 g DI water) was gradually added to the flask over 120 min. Polymerization reaction temperature was maintained at 84-86° C. After the addition was completed, a rinse of DI water (55 g) was added back to the flask. Upon completing the addition, the reaction mixture was held at 70° C. for 60 min. The reaction was then cooled to 50° C. and then neutralized to pH 7.0-8.5 by DMEA (50%). The mixture in the flask was held at 45-50° C. for 10 min and then cooled to room temperature to get a polymer emulsion with a measured Tg of 48.43° C. by DSC.

Exs 3 and 6-8

The aqueous dispersion of Ex 3 and 6-8 was prepared as in Ex 2 except that monomer formulations for preparing the monomer emulsion are listed in Table 1-1. The obtained polymer emulsion of Ex 3 had a measured Tg of 47.10° C. by DSC. The obtained polymer of Ex 7 had a number average molecular weight (Mn) of 6237 and a weight average molecular weight (Mw) of 15578 as measured by GPC. The obtained polymer of Ex 8 had Mn of 10029 and Mw of 84458 as measured by GPC.

Ex 4

Fes 993 surfactant (19.06 g, 30% active) was dissolved in DI water (91.75 g), with stirring. Then ingredients listed in Table 1-1 were slowly added to the resultant agitated solution to obtain a monomer emulsion (ME). A solution containing Fes 993 surfactant (3.36 g, 30% active) and DI water (290 g) was placed in the 1 L flask and heated to 86° C. under $N_2$. An aqueous initiator solution of APS (0.51 g in 4.60 g DI water), and 4.00% of the ME were added to the flask. DI water (4.68 g) was used to rinse the above vessels. In about 5 min, initiation of polymerization was confirmed by the increase of temperature by 3° C. and a change of the external appearance of the reaction mixture. After heat generation ended, a solution of $Na_2CO_3$ (0.51 g in 6.8 g DI water) was charged into the flask. Then the remainder of the ME was added gradually to the flask over 120 min, with stirring. At the same time, an aqueous initiator solution of APS (0.51 g in 25.02 g DI water) was gradually added to the flask over 120 min. Polymerization reaction temperature was maintained at 84-86° C. After the addition was completed, a rinse of DI water (22 g) was added back to the flask. Upon completing the addition, the reaction mixture was held at 70° C. for 60 min. The reaction was then cooled to 50° C. and then neutralized to pH 7.0-8.5 by DMEA (50%). The mixture in the flask was held at 45-50° C. for 10 min and then cooled to room temperature to get a polymer emulsion with a measured Tg of 49.15° C. by DSC.

Ex 5

The aqueous dispersion of Ex 5 was prepared as in Ex 4 except that ingredients for preparing the monomer emulsion are listed in Table 1-1. The obtained polymer emulsion had a measured Tg of 47.75° C. by DSC.

Comparative (Comp) Exs 1-7 and 11

The aqueous dispersions of Comp Exs 1-7 and 11 were prepared as in Ex 2 except that ingredients for preparing each monomer emulsion are listed in Table 1-2.

Comp Exs 8 and 9

The aqueous dispersions of Comp Exs 8 and 9 were prepared as in Ex 4 except that ingredients for preparing each monomer emulsion are listed in Table 1-2.

Comp Ex 10

Fes 993 surfactant (21.02 g, 30% active) was dissolved in DI water (101.16 g), with stirring. Then ingredients listed in Table 1-2 were slowly added to the resultant agitated solution to obtain a monomer emulsion (ME). A solution containing Fes 993 surfactant (3.71 g, 30% active) and DI water (295.6 g) was placed in the 1 L flask and heated to 86° C. under $N_2$. An aqueous initiator solution of APS (0.56 g in 5 g DI water), and 2.00% of the ME were added to the flask. DI water (5.16 g) was used to rinse the above vessels. In about 5 min, initiation of polymerization was confirmed by the increase of temperature by 3° C. and a change of the external appearance of the reaction mixture. After heat generation ended, a solution of $Na_2CO_3$ (0.56 g in 7.6 g DI water) was charged into the flask. Then the remainder of the ME was added gradually to the flask over 120 min, with stirring. At the same time, an aqueous initiator solution of APS (0.56 g APS in 27.56 g DI water) was gradually added to the flask over 120 min. Polymerization reaction temperature was maintained at 84-86° C. After the addition was completed, a rinse of DI water (24 g) was added back to the flask. Upon completing the addition, the reaction mixture was held at 70° C. for 60 min. The reaction was then cooled to 50° C. and then neutralized to pH 7.0-8.5 by DMEA (50%). The mixture in the flask was held at 45-50° C. for 10 min and then cooled to room temperature to get a polymer emulsion.

TABLE 1-1

Ingredients used in ME for preparing polymer emulsions

| gram | t-BMA | ST | EHA | HPMA | HEMA | MAA | PEM | MMA | n-DDM |
|---|---|---|---|---|---|---|---|---|---|
| Ex 1 | 149.43 | 254.03 | 164.26 | 164.26 | 0 | 11.95 | 1.50 | 1.50 | 15.05 |
| Ex 2 | 173.75 | 330.14 | 173.75 | 0 | 173.75 | 13.90 | 1.75 | 1.75 | 17.50 |
| Ex 3 | 156.38 | 356.20 | 165.07 | 0 | 173.75 | 13.90 | 1.75 | 1.75 | 17.50 |
| Ex 4 | 67.76 | 101.64 | 60.99 | 0 | 101.64 | 5.42 | 0.68 | 0.68 | 6.83 |
| Ex 5 | 67.76 | 133.83 | 67.76 | 0 | 67.76 | 1.36 | 0.17 | 0.17 | 6.83 |
| Ex 6 | 173.75 | 328.40 | 173.75 | 0 | 173.75 | 15.64 | 1.75 | 1.75 | 17.50 |
| Ex 7 | 217.20 | 278.01 | 182.45 | 0 | 173.75 | 13.90 | 1.75 | 1.75 | 17.50 |
| Ex 8 | 173.50 | 330.14 | 173.75 | 0 | 173.75 | 13.90 | 1.75 | 1.75 | 0 |

TABLE 1-2

Ingredients used in ME for preparing polymer emulsions

| gram | Comp Ex 1 | Comp Ex 2 | Comp Ex 3 | Comp Ex 4 | Comp Ex 5 | Comp Ex 6 | Comp Ex 7 | Comp Ex 8 | Comp Ex 9 | Comp Ex 10 | Comp Ex 11 |
|---|---|---|---|---|---|---|---|---|---|---|---|
| t-BMA | 0 | 130.32 | 0 | 173.75 | 260.63 | 0 | 0 | 67.76 | 67.76 | 0 | 0 |
| IBMA | 0 | 0 | 0 | 0 | 0 | 0 | 173.75 | 0 | 0 | 0 | 0 |
| BMA | 0 | 0 | 0 | 0 | 0 | 173.75 | 0 | 0 | 0 | 0 | 0 |
| t-BA | 0 | 0 | 173.75 | 0 | 0 | 0 | 0 | 0 | 0 | 0 | 0 |
| IBOMA | | | | | | | | | | 74.71 | 0 |
| CHMA | | | | | | | | | | 0 | 173.15 |
| ST | 512.65 | 382.27 | 425.71 | 330.14 | 225.88 | 443.09 | 417.02 | 155.86 | 128.75 | 127.01 | 295.38 |
| EHA | 147.71 | 165.07 | 78.19 | 173.75 | 191.13 | 60.82 | 86.88 | 74.52 | 67.76 | 82.13 | 191 |
| HPMA | 191 | 0 | 0 | 0 | 0 | 0 | 0 | 0 | 0 | 82.13 | 191 |
| HEMA | 0 | 173.75 | 173.75 | 173.75 | 173.75 | 173.75 | 173.75 | 33.88 | 67.76 | 0 | 0 |
| MAA | 13.9 | 13.9 | 13.9 | 17.4 | 13.9 | 13.9 | 13.9 | 5.42 | 0 | 5.98 | 13.9 |
| PEM | 1.75 | 1.75 | 1.75 | 0 | 1.75 | 1.75 | 1.75 | 0.68 | 3.39 | 0.755 | 1.75 |
| MMA | 1.75 | 1.75 | 1.75 | 0 | 1.75 | 1.75 | 1.75 | 0.68 | 3.39 | 0.755 | 1.75 |
| n-DDM | 17.5 | 17.5 | 17.5 | 17.5 | 17.5 | 17.5 | 17.5 | 6.83 | 6.83 | 7.53 | 17.5 |

TABLE 2

Properties of polymer emulsions

| | pH | Solids content[1] (%) | Viscosity[2] (centipoise) | Particle size (nm) | MFFT[3] (° C.) |
|---|---|---|---|---|---|
| Comp Ex 1 | 7.00 | 42.78 | 245.00 | 90 | 58 |
| Ex 1 | 7.00 | 42.65 | 307.00 | 90 | 46 |
| Ex 2 | 7.02 | 41.91 | 984.00 | 99 | 46 |
| Comp Ex 2 | 6.94 | 41.08 | 1012.00 | 90 | |
| Comp Ex 3 | 6.90 | 40.91 | 804.00 | 89 | |
| Comp Ex 4 | 7.48 | 41.97 | 1014 | 94 | |
| Ex 3 | 7.45 | 42.00 | 1066 | 96 | |
| Comp Ex 5 | 8.49 | 42.85 | 1420 | 99 | |
| Comp Ex 6 | 6.60 | 41.48 | 540 | 95 | |
| Comp Ex 7 | 6.68 | 41.54 | 692 | 94 | |
| Comp Ex 8 | 7.26 | 38.78 | 189 | 98 | 46 |
| Ex 4 | 7.16 | 40.66 | 1110 | 88 | 46 |
| Comp Ex 9 | 7.13 | 38.95 | 370 | 98 | 44 |
| Ex 5 | 7.29 | 41.98 | 680 | 92 | 46 |
| Ex 6 | 7.42 | 41.57 | 1046 | 93 | 50 |
| Ex 7 | 7.59 | 41.8 | 1124 | 97 | 50 |
| Ex 8 | 7.55 | 41.25 | 992 | 95 | 63 |
| Com Ex 10 | 7.00 | 42.84 | 340.00 | 87 | |
| Com Ex 11 | 7.00 | 43.02 | 330.00 | 87 | |

[1]Solids content was measured by weighting 0.7 ± 0.1 g of a polymer emulsion sample (wet weight of the sample is denoted as "W1"), putting the sample into an aluminum pan (weight of aluminum pan is denoted as "W2") in an oven at 150° C. for 25 min, and then cooling and weighting the aluminum pan with the dried sample with total weight denoted as "W3". Solids content is calculated by (W3-W2)/W1*100%; [2]Viscosity measured by Brookfield viscometer DV-I Primer (60 rpm, spindle #2); [3]MFFT was measured by Coesfeld MFFT instrument. The MFFT was measured by casting a 75 μm wet film of an emulsion on a heating plate with a gradient temperature. The film was dried and the minimum temperature at which a coherent film is formed was recorded as the MFFT.

Coating Compositions and Comparative Coating Compositions

Coating compositions and comparative coating compositions were prepared based on formulations given in Table 3, where the polymer dispersions prepared above were used as binders. The coating composition of Coating P4 was prepared by using the binder of Ex 4 based on Formulation I. The comparative coating composition of CP8 was prepared by using the binder of Comp Ex 8 based on Formulation II. The coating compositions of P1-P3 and P5-P8, and comparative coating compositions of CP1-CP7 and CP9-CP11 were prepared, respectively, based on Formulation III. The mole ratio of NCO group to OH group in each coating composition was 1.5:1. Ingredients in the grind stage were mixed using a high speed Cowles disperser at 1,500 revolutions per minute (rpm) for 30 min. Then, ingredients in the letdown stage were added using a conventional lab mixer to obtain Component A. Component A of each paint formulation was left overnight, and then Component B was added into Component A using a high speed Cowles disperser to form the paint formulation 600 rpm for 10 min. The resultant coating compositions were measured for properties according to the test methods described above and results are given in Table 4.

TABLE 3

| Coating composition | Formulation I | Formulation II | Formulation III |
|---|---|---|---|
| Component A | | | |
| Grind | | | |
| water | 5 | 5 | 5 |
| DISPERBYK-190 (BYK-190) dispersant (BYK Additives & Instruments) | 0.45 | 0.45 | 0.45 |
| Ti-Pure R-706 titanium dioxide (DuPont) | 18 | 18 | 18 |
| Tego 1488 defoamer (Evonik) | 0.2 | 0.2 | 0.2 |
| Letdown | | | |
| Comp Exs 1-7 and 9-11, Exs 1-3 and 5-8 binders | | | 50 |
| Comp Ex 8 binder | | 63 | |
| Ex 4 binder | 45 | | |
| H$_2$O | 10.04 | 0.22 | 6.35 |
| 2-Butoxy ethanol (EB) solvent (Sinopharm Chemical Reagent Co., Ltd.) | 2 | 2.5 | 3 |
| DOWANOL™ DPnB Dipropylene glycol mono butyl ether coalescent (The Dow Chemical Company) | 3 | 3 | 4 |
| Byk 345 wetting agent (BYK Additives & Instruments) | 0.5 | 0.5 | 0.5 |
| Tego 1488 defoamer | 0.1 | 0.1 | 0.1 |
| ACRYSOL™ RM-5000 rheology modifier (hydrophobically modified ethylene oxide urethane (HEUR)) (The Dow Chemical Company) | 0.2 | 0.2 | 0.2 |
| ACRYSOL RM-845 HEUR rheology modifier (The Dow Chemical Company) | 0.2 | 0.2 | 0.2 |
| Component B | | | |
| Dipropyleneglycol dimethyl ether (DMM) solvent (The Dow Chemical Company) | 3.06 | 1.33 | 2.40 |
| Aquolin 268 water dispersible HDI isocyanate (NCO content: 20.5%) used as a curing agent (Wanhua Chemical Company, China) | 12.25 | 5.30 | 9.60 |
| Total | 100 | 100 | 100 |
| Paint solids (%) | 30.6 | 30.0 | 30.7 |

*DOWANOL and ACRYSOL are trademarks of The Dow Chemical Company.

The above obtained coating compositions were evaluated for properties according to the test methods described above and results are given in Table 4. As shown in Table 4, the binders of Exs 1-8 comprising the combination of a specific amount of structural units of t-BMA, structural units of PEM, and structural units of additional acid monomers all provided coatings with hardness of at least 2H (Coatings P1-P8). In addition, all these binders also provided coatings with desirable impact resistance, acid resistance, alkali resistance, water resistance, and alcohol resistance properties.

In contrast, binders comprising zero structural units of t-BMA (Com Ex 1), 15% (Com Ex 2) or 30% (Com Ex 5) of structural units of t-BMA provided coatings with hardness of H. The binders comprising structural units of t-BA (Comp Ex 3), BMA (Comp Ex 6), or IBMA (Comp Ex 7), IBOMA (Comp Ex 10), and CHMA (Comp Ex 11) all provided coatings with hardness of H. The binders comprising structural units of only one type of acid monomers (Comp Exs 4 and 9) both provided coatings with hardness of H. The binder of Comp Ex 8 comprising 10% structural units of HEMA provided coatings with hardness of F and poor alkali resistance.

TABLE 4

Properties of Coatings

| | Pencil hardness | Impact (cm) | Acid resistance | Alkali resistance | Alcohol resistance |
|---|---|---|---|---|---|
| Comp Ex 1 | H | >80 | 5 | 5 | 5 |
| Ex 1 | 2H | >80 | 5 | 5 | 5 |
| Ex 2 | 2H | >80 | 5 | 5 | 5 |
| Comp Ex 2 | H | >80 | 5 | 5 | 5 |
| Comp Ex 3 | H | >80 | 5 | 5 | 5 |
| Comp Ex 4 | H | 55 | 5 | 5 | 5 |
| Ex 3 | 2H | 50 | 5 | 5 | 5 |
| Comp Ex 5 | H | 45 | 5 | 5 | 5 |
| Comp Ex 6 | H | 40 | 5 | 5 | 5 |
| Comp Ex 7 | H | 40 | 5 | 5 | 5 |
| Comp Ex 8 | F | 5 | 4 | 3 | 4 |
| Ex 4 | 2H | 20 | 4 | 4 | 4 |
| Comp Ex 9 | H | 55 | 4 | 4 | 4 |
| Ex 5 | 2H | 40 | 4 | 4 | 4 |
| Ex 6 | 2H | 50 | 4 | 4 | 4 |
| Ex 7 | 2H | 45 | 4 | 4 | 4 |
| Ex 8 | 2H | 50 | 4 | 4 | 4 |
| Comp Ex 10 | H | >80 | 5 | 5 | 5 |
| Comp Ex 11 | H | >80 | 5 | 5 | 5 |

What is claimed is:

1. A two-component polyurethane composition comprising,
   (A) an emulsion polymer comprising, by weight based on the weight of the emulsion polymer,
      (a) greater than 15% to less than 30% of structural units of tert-butyl methacrylate,
      (b) greater than 10% of structural units of a hydroxy-functional alkyl (meth)acrylate,
      (c) structural units of a phosphorous-containing acid monomer and/or a salt thereof,
      (d) structural units of an additional acid monomer and/or a salt thereof, and
      (e) structural units of an additional monoethylenically unsaturated nonionic monomer;
   wherein the weight ratio of (d)/(c) is in the range of from 7.1:1 to 9.9:1; and
   (B) a water-dispersible polyisocyanate.

2. The polyurethane composition of claim 1, wherein the phosphorous-containing acid monomer and the salt thereof are selected from the group consisting of phosphoethyl (meth)acrylate, phosphopropyl (meth)acrylate, phosphobutyl (meth)acrylate, allyl ether phosphate; salts thereof; and mixtures thereof.

3. The polyurethane composition of claim 1, wherein the hydroxy-functional alkyl (meth)acrylate is selected from the group consisting of 2-hydroxyethyl acrylate, 2-hydroxyethyl methacrylate, 2-hydroxypropyl acrylate, 2-hydroxypropyl methacrylate, 3-hydroxypropyl acrylate, 3-hydroxypropyl methacrylate, and mixtures thereof.

4. The polyurethane composition of claim 1, wherein the additional acid monomer and the salt thereof is selected from the group consisting of methacrylic acid, acrylic acid, itaconic acid, sodium vinyl sulfonate, sodium styrene sulfonate, 2-acrylamido-2-methylpropane sulfonic acid and a salt thereof, and mixtures thereof.

5. The polyurethane composition of claim 1, wherein the emulsion polymer has a measured glass transition temperature of from 15 to 85° C.

6. The polyurethane composition of claim 1, wherein the emulsion polymer comprises, by weight based on the weight of the emulsion polymer, from 18% to 25% of structural units of tert-butyl methacrylate.

7. The polyurethane composition of claim 1, wherein the weight ratio of (d)/(c) is in the range of from 7.5:1 to 8.5:1.

8. The polyurethane composition of claim 1, wherein the emulsion polymer has a particle size of from 50 to 300 nm.

9. The polyurethane composition of claim 1, wherein the equivalent ratio of the total number of isocyanate group equivalents in the polyisocyanate, to the total number of hydroxyl group equivalents in the emulsion polymer is in the range of from 0.8:1 to 3:1.

10. The polyurethane composition of claim 1, wherein the emulsion polymer comprises, by weight based on the weight of the emulsion polymer,
    (a) from 18% to 25% of structural units of tert-butyl methacrylate,
    (b) from 12% to 35% of structural units of the hydroxy-functional alkyl (meth)acrylate,
    (c) structural units of the phosphorous-containing acid monomer and/or the salt thereof,
    (d) structural units of the additional acid monomer and/or the salt thereof, and
    (e) from 37% to 69.5% of structural units of the additional monoethylenically unsaturated nonionic; wherein the weight ratio of (d)/(c) is in the range of from 7.5:1 to 9.5:1.

11. The polyurethane composition of claim 1, further comprising a pigment, an extender, or mixtures thereof.

12. A process of preparing a two-component polyurethane composition, comprising:
    (i) providing an emulsion polymer comprising, by weight based on the weight of the emulsion polymer,
        (a) greater than 15% to less than 30% of structural units of tert-butyl methacrylate,
        (b) greater than 10% of structural units of a hydroxy-functional alkyl (meth)acrylate,
        (c) structural units of a phosphorous-containing acid monomer and/or a salt thereof,
        (d) structural units of an additional acid monomer and/or a salt thereof, and
        (e) structural units of an additional monoethylenically unsaturated nonionic monomer;
    wherein the weight ratio of (d)/(c) is in the range of from 7.1:1 to 9.9:1; and
    (ii) mixing the emulsion polymer from step (i) with a water-dispersible polyisocyanate.

13. The polyurethane composition of claim 1 wherein the phosphorous-containing acid monomer is phosphoethyl (meth)acrylate, the additional acid monomer is methacrylic acid, and the hydroxy-functional alkyl (meth)acrylate comprises hydroxyethyl methacrylate or hydroxypropyl methacrylate.

14. The process of claim 12 wherein the phosphorous-containing acid monomer is phosphoethyl (meth)acrylate, the additional acid monomer is methacrylic acid, and the hydroxy-functional alkyl (meth)acrylate comprises hydroxyethyl methacrylate or hydroxypropyl methacrylate.

* * * * *